(12) United States Patent
Koo

(10) Patent No.: US 10,731,832 B2
(45) Date of Patent: Aug. 4, 2020

(54) LIGHTING DEVICE MOUNTABLE TO GLASSES

(71) Applicant: DENTOZONE CO., LTD., Seoul (KR)

(72) Inventor: Cha Hyoung Koo, Seoul (KR)

(73) Assignee: DENTOZONE CO., LTD., Seoul (KR)

( * ) Notice: Subject to any disclaimer, the term of this patent is extended or adjusted under 35 U.S.C. 154(b) by 0 days.

(21) Appl. No.: 16/462,665

(22) PCT Filed: Nov. 21, 2017

(86) PCT No.: PCT/KR2017/013217
§ 371 (c)(1),
(2) Date: May 21, 2019

(87) PCT Pub. No.: WO2018/097564
PCT Pub. Date: May 31, 2018

(65) Prior Publication Data
US 2020/0080710 A1 Mar. 12, 2020

(30) Foreign Application Priority Data
Nov. 23, 2016 (KR) .......................... 10-2016-0156307

(51) Int. Cl.
*F21V 21/088* (2006.01)
*F21V 15/01* (2006.01)
(Continued)

(52) U.S. Cl.
CPC ............. *F21V 21/088* (2013.01); *F21L 4/00* (2013.01); *F21V 15/01* (2013.01); *F21V 23/02* (2013.01);
(Continued)

(58) Field of Classification Search
None
See application file for complete search history.

(56) References Cited

U.S. PATENT DOCUMENTS 5,615,657 A 4/1997 Yoshizawa
6,974,226 B2 12/2005 Chang
(Continued)

FOREIGN PATENT DOCUMENTS

JP 2003-263918 A 9/2003
JP 3140809 U 4/2008
(Continued)

OTHER PUBLICATIONS

International Search Report for PCT/KR2017/013217 dated May 29, 2018.

*Primary Examiner* — Ashok Patel
(74) *Attorney, Agent, or Firm* — The PL Law Group, PLLC

(57) ABSTRACT

A lighting device according to an embodiment of the present invention includes a first housing part, a lighting part provided on a front surface of the first housing part, a second housing part provided to be spaced apart from a rear of the first housing part; a first mounting part provided by protruding from a lower part of the first housing part so as to mount the lighting device on the glasses, a second mounting part provided by protruding from a lower part of the second housing part so as to mount the lighting device on the glasses, and a combining clip connecting the first housing part with the second housing part at a position therebetween and providing an elastic force such that the first and second mounting parts are brought closer to each other.

11 Claims, 5 Drawing Sheets

(51) Int. Cl.
*F21V 23/06* (2006.01)
*F21L 4/00* (2006.01)
*F21V 23/02* (2006.01)
*G02C 11/04* (2006.01)
*F21Y 115/10* (2016.01)

(52) U.S. Cl.
CPC .............. *F21V 23/06* (2013.01); *G02C 11/04* (2013.01); *F21Y 2115/10* (2016.08)

(56) References Cited

U.S. PATENT DOCUMENTS

2019/0072262 A1* 3/2019 Zeng ...................... F21V 29/508
2019/0390842 A1* 12/2019 Li ........................... F21V 19/00

FOREIGN PATENT DOCUMENTS

| JP | 2012-189970 A | 10/2012 |
|---|---|---|
| KR | 20-1988-0020256 Y1 | 12/1989 |

\* cited by examiner

LIGHTING DEVICE MOUNTABLE TO GLASSES

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2017/013217, filed Nov. 21, 2017, which claims priority to the benefit of Korean Patent Application No. 10-2016-0156307 filed in the Korean Intellectual Property Office on Nov. 23, 2016, the entire contents of which are incorporated herein by reference.

TECHNICAL FIELD

The present invention relates to a technology of providing lighting by being mounted to glasses.

BACKGROUND ART

A device which provides lighting in a direction of a user's view by being mounted on a head of the user includes a lighting device fixed to a hat and a lighting device attached to a headband, etc.

However, as for the lighting devices, whenever the lighting devices are used, the user is required to wear the hat or the headband.

To improve the problem, although lighting devices fixed to glasses have been developed, they are configured to be integral to the glasses. Accordingly, the problem that the glasses are required to be worn remains.

SUMMARY

An embodiment of the present invention is intended to provide a lighting device attachable to/detachable from glasses.

The lighting device according to an embodiment of the present invention is a lighting device mountable to glasses, the lighting device including: a first housing part; a lighting part provided on a front surface of the first housing part; a second housing part provided to be spaced apart from a rear of the first housing part; a first mounting part provided by protruding from a lower part of the first housing part so as to mount the lighting device on the glasses; a second mounting part provided by protruding from a lower part of the second housing part and spaced apart from the first mounting part so as to mount the lighting device on the glasses; and a combining clip connecting the first housing part with the second housing part at a position therebetween and providing an elastic force such that the first and second mounting parts, which are spaced apart from each other, are brought closer to each other.

The combining clip may include: a first clip part combined on a rear surface of the first housing part; and a second clip part provided by being bent from an upper end of the first clip part to a lower part thereof to correspond to the first clip part so as to be combined on a front surface of the second housing part.

The combining clip may further include a first cut part provided by being cut from a lower end of the first clip part to an upper part thereof; and a second cut part provided by being cut from a lower end of the second clip part to an upper part thereof.

The lighting device may further include: a mainboard provided in any one of the first housing part and the second housing part; a battery provided in a remaining one of the first housing part and the second housing part; and a conductive line electrically connecting the mainboard to the battery by passing through the combining clip via the first cut part and the second cut part.

The lighting device may further include: a first clip combining part provided on the rear surface of the first housing part so as to be combined with the first clip part; a second clip combining part provided on the front surface of the second housing part so as to be combined with the second clip part; a first groove provided on the first clip combining part to correspond to the first cut part so as to pass the conductive line therethrough; and a second groove provided on the second clip combining part to correspond to the second cut part so as to pass the conductive line therethrough.

The lighting device may be detached from the glasses when an elastic force of the combining clip is released by external pressure applied to an upper end of the first housing part and an upper end of the second housing part.

The lighting device may further include: a first auxiliary combining part provided on a rear surface of the first housing part at opposite sides of the combining clip; and a second auxiliary combining part provided on a front surface of the second housing part at opposite sides of the combining clip to correspond to the first auxiliary combining part so as to be combined with the first auxiliary combining part.

The lighting device may further include: a holding combination part provided on the front surface of the first housing part; a rotating combination part provided on a rear surface of the lighting part so as to be rotatable on the holding combination part in a first direction and a second direction contrary to the first direction; a contact part provided on the rear surface of the lighting part along the first direction, the contact part having alternate convex and concave parts; and a contact holding part provided on the front surface of the first housing part so as to gradually hold the rotating combination part by being held in the concave parts by rotation of the rotating combination part.

The contact part may be electrically connected to a light-emitting diode of the lighting part, and the contact holding part may be electrically connected to a mainboard of the first housing part, wherein the contact part and the contact holding part may be made of conductive materials.

The contact part may include a first contact part provided on a first side of the rear surface of the lighting part so as to have a first length and a second contact part provided on a second side of the rear surface so as to have a second length shorter than the first length, and the contact holding part may include a first contact holding part held in the concave parts of the first contact part and a second contact holding part held in the concave parts of the second contact part.

The first contact part and the second contact part may be arranged so as to be parallel to the first direction, each upper end of the first contact part and the second contact part being arranged at the same position as a position of the axis parallel to the first direction, and when the lighting part rotates at a preset angle or more, electrical connection between the second contact part and the second contact holding part may be disconnected.

According to an embodiment of the present invention, there is provided a lighting device attachable to/detachable from glasses by using the elastic force of a combining clip.

In addition, according to the embodiment of the present invention, there is provided the lighting device, wherein the turning on/off of the lighting device is controlled by the control of a rotating angle of the lighting part.

DETAILED DESCRIPTION

Hereinbelow, an embodiment of the present invention will be described in detail with reference to the accompanying drawings. Detailed description below is provided to help comprehensive understanding concerning a method, a device, and/or a system described herein. However, the embodiment of the present invention is disclosed only for illustrative purposes and should not be construed as limiting the present invention.

In the following description of the present invention, detailed descriptions of known functions and components incorporated herein will be omitted when it may make the subject matter of the present invention unclear. Terms that will be described later are set in consideration of functions of the present invention, which may vary according to intentions or practices of manufacturers, and thus the definition of the terms should be made on the basis of contents throughout the specification. Terms used in the detailed description are merely intended to describe the embodiment of the present invention, and should not be used narrowly. As used herein, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Figure 1:
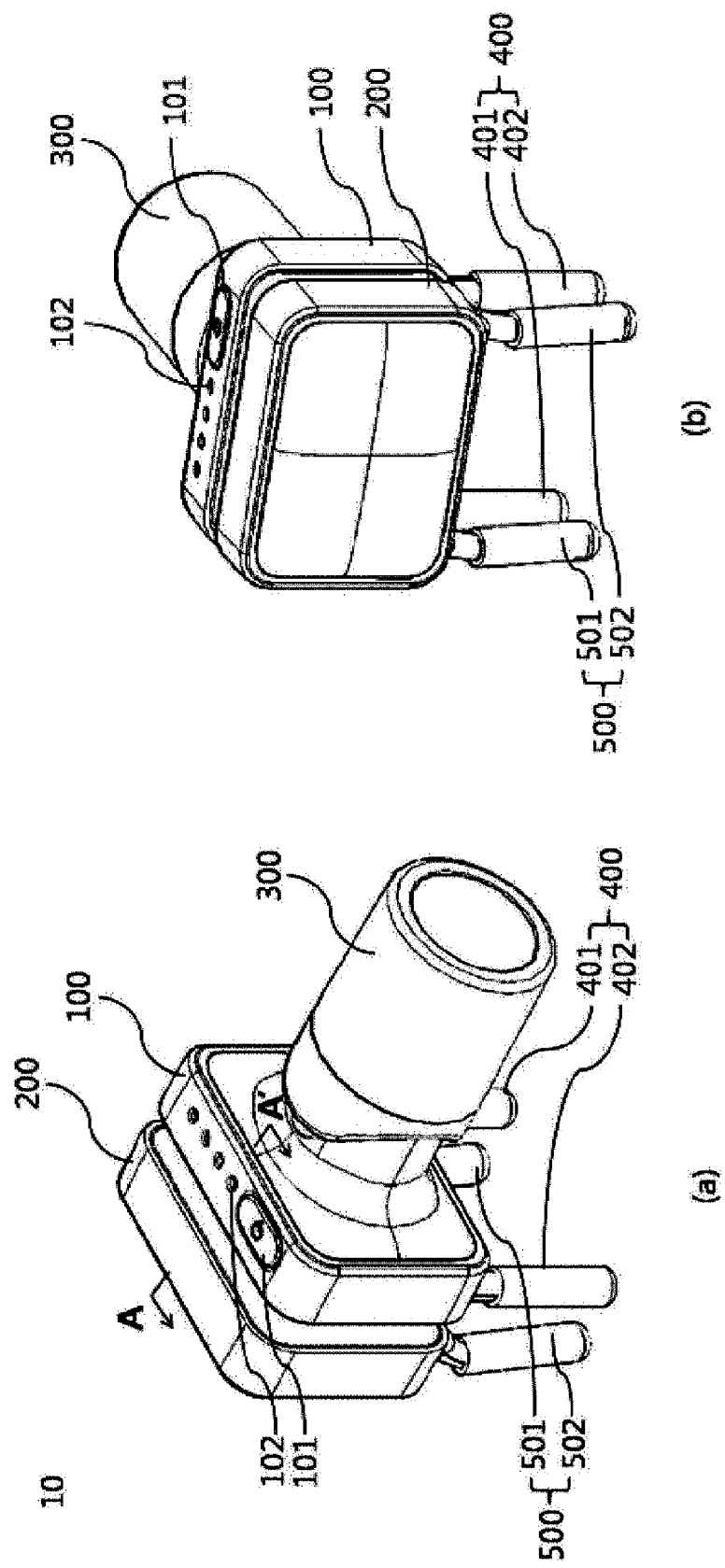
FIG. 1 is perspective views of a lighting device mountable to glasses according to an embodiment of the present invention.

FIG. 1 is perspective views of a lighting device mountable to glasses according to the embodiment of the present invention, (a) of FIG. 1 is the perspective view of the lighting device 10 shown from the front thereof, and (b) of FIG. 1 is the perspective view of the lighting device 10 shown from the rear part thereof. Furthermore, FIG. 2 is a cross-sectional view of the lighting device mountable to glasses according to the embodiment of the present invention shown in a direction of an arrow by being taken along line A-A' of the lighting device 10 in FIG. 1.

Figure 2:
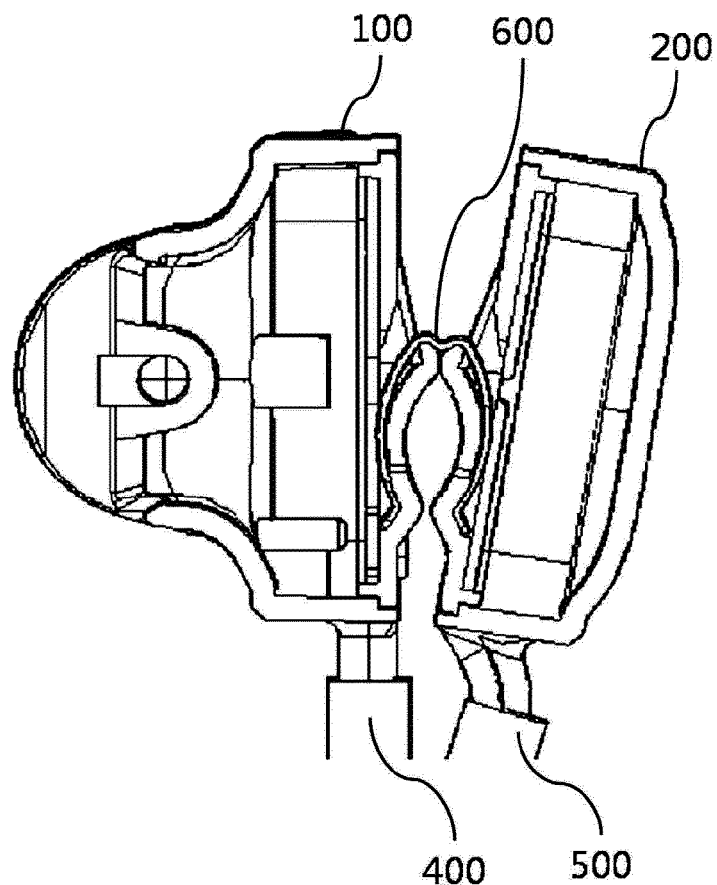
FIG. 2 is a cross-sectional view of the lighting device mountable to glasses according to the embodiment of the present invention.

Referring to FIGS. 1 and 2, the lighting device 10 mountable to glasses according to the embodiment of the present invention includes a first housing part 100, a second housing part 200, a lighting part 300, a first mounting part 400, a second mounting part 500, and a combining clip 600.

The first housing part 100 may be provided so as to include a predetermined space therein. Particularly, the first housing part 100 may be a hexahedrally-shaped outer frame having round edges. However, this is only one embodiment to describe the present invention, and the first housing part 100 may be provided in other shapes other than the hexahedral shape.

In addition, the first housing part 100 may include a power button 101 provided thereon so as to control power of the lighting device 10. Particularly, a user may control lighting on/off by using the power button 101 positioned on the first housing part 100.

Furthermore, the first housing part 100 may include a battery display part 102 provided thereon so as to display a remaining battery amount of the lighting device 10. In this case, the battery display part 102 may be a lighting device such as an LED. Particularly, the battery display part 102 may include a plurality of lighting devices and display the remaining battery amount by turning on the lighting device of a number proportional to the remaining battery amount.

In addition, though not shown in the drawings, the first housing part 100 may include a lighting control part provided thereon so as to control lighting brightness of the lighting device 10. In this case, the lighting control part, for example, may be touch screens provided on opposite sides of the first housing part 100. Particularly, a user may gradually increase the lighting brightness by touching the lighting control part. Furthermore, when the lighting brightness of the lighting device 10 is at maximum level, a user may control the lighting brightness to minimum level by touching the lighting control part.

The second housing part 200 is provided so as to be spaced apart from a rear of the first housing part 100. Particularly, the second housing part 200 may be a hexahedrally-shaped outer frame having round edges, the frame having a predetermined space therein. However, this is one embodiment to describe the present invention, and the second housing part 200 may be provided in other shapes except for the hexahedral shape.

The lighting part 300 is provided on a front surface of the first housing part 100. Particularly, the lighting part 300 may be provided on the front surface of the first housing part 100 so as to have a cylindrical shape. Merely, this is one embodiment to describe the present invention, and the lighting part 300 may be provided in other shapes except for the cylindrical shape.

In addition, the lighting part 300, for example, is combined on the first housing part 100 so as to be rotatable up and down. The rotation of the lighting part 300 up and down is merely one embodiment, and the lighting part may be combined so as to rotate in other directions, and the combination of the lighting part 300 with the first housing part 100 will be described in detail referring to FIG. 5.

In addition, the lighting part 300, for example, may include a lighting device such as a light-emitting diode (LED) and provide lighting to a front of the lighting part 300. Particularly, the lighting part 300 may provide lighting to the front by receiving electric power from a battery included in the lighting device 10.

The first mounting part 400 is provided on a lower part of the first housing part 100 by protruding therefrom and performs the function of mounting the lighting device 10 to glasses (not shown). Particularly, the first mounting part 400 may include the mounting parts 401 and 402 provided on the lower part of the first housing part 100 by protruding therefrom so as to be spaced apart from each other. However, this is one embodiment to describe the present invention, and the first mounting part 400 may include only one mounting part provided to be longitudinal from side to side or may be provided in other shapes.

The second mounting part 500 is provided on a lower part of the second housing part 200 by protruding therefrom and is spaced apart from the first mounting part 400, and performs the function of mounting the lighting device 10 to glasses. Particularly, the second mounting part 500 may include the mounting parts 501 and 502 provided on the lower part of the second housing part 200 by protruding therefrom so as to be spaced apart from each other. In this case, the mounting part 501 may be provided at a position corresponding to a position of the mounting part 401, and the mounting part 502 may be provided at a position corresponding to a position of the mounting part 402. However, this is one embodiment to describe the present invention, and the second mounting part 500 may include only one mounting part provided to be longitudinal from side to side or may be provided in other shapes.

Meanwhile, the first mounting part 400 and the second mounting part 500 are provided to be spaced apart from each other, and may be brought closer to each other by receiving an elastic force from the combining clip 600. In this case, since the first mounting part 400 and the second mounting part 500 are provided at positions corresponding to each other, the first mounting part 400 and the second mounting part 500 may include the glasses therebetween so as to mount the lighting device 10 to the glasses.

The combining clip 600 connects the first housing part 100 with the second housing part 200 between the first housing part 100 and the second housing part 200 and provides the elastic force so that the first mounting part 400 and the second mounting part 500 spaced apart from each other are brought closer to each other. Particularly, a first end of the combining clip 600 is combined on the first housing part 100 and a second end of the combining clip is combined on the second housing part 200, so that the first mounting part 400 may be connected with the second mounting part 500. In addition, the combining clip 600 physically connects the first mounting part 400 with the second mounting part 500, and thus may induce electrical connection between the first mounting part 400 and the second mounting part 500. The electrical connection between the first mounting part 400 and the second mounting part 500 will be described in detail referring to FIG. 5.

In addition, the combining clip 600 may provide the elastic force so that the lower part of the first housing part 100 and the lower part of the second housing part 200 are brought of closer to each other. Accordingly, the first mounting part 400 and the second mounting part 500 provided on each of the lower parts of the first housing part 100 and the second housing part 200 may be brought closer to each other.

According to the embodiment of the present invention, the lighting device 10 attachable to/detachable from glasses (not shown) by using the elastic force of the combining clip 600 may be provided.

Figure 3:
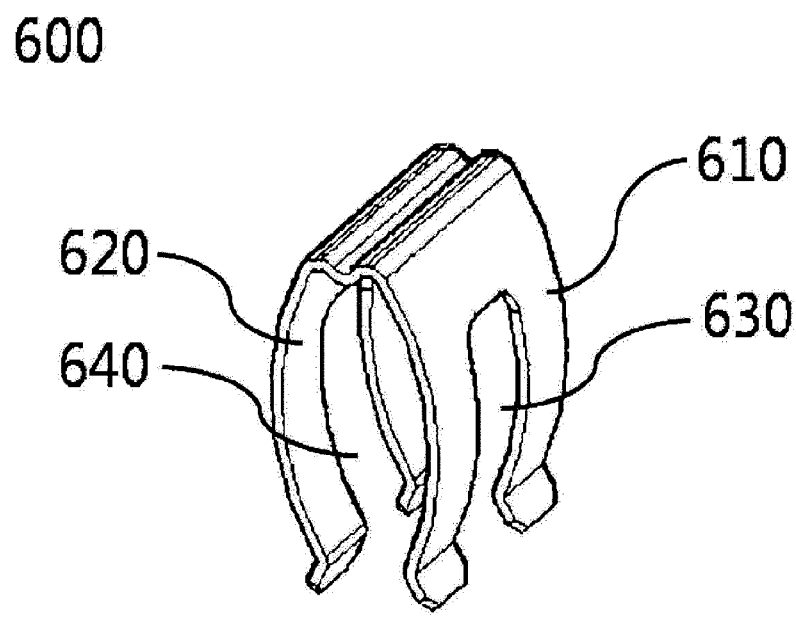
FIG. 3 is a perspective view of a combining clip according to the embodiment of the present invention.

FIG. 3 is a perspective view of the combining clip according to the embodiment of the present invention.

Referring to FIG. 3, the combining clip 600 according to the embodiment of the present invention may include a first clip part 610, a second clip part 620, a first cut part 630 and a second cut part 640.

The first clip part 610 may be combined on a rear surface of the first housing part 100. Particularly, the first clip part 610 may be combined on the rear surface of the first housing part 100 by being fitted thereto to a lower end of the first housing part from an upper end thereof. Merely, this is one embodiment to describe the present invention, and the first clip part 610 may be combined on the rear surface of the first housing part 100 in various ways.

The first cut part 630 may be provided by being cut from a lower end of the first clip part 610 to an upper part thereof. For example, the first cut part 630 may be provided by being cut from a middle lower end of the first clip part 610 to a middle upper part thereof so as to have a rectangular shape. Accordingly, the first clip part 610 may be provided so as to have a pair of legs with the first cut part 630 between the pair of legs. However, this is one embodiment to describe the present invention, and the first cut part 630 may be provided in various shapes.

The second clip part 620 is provided by being bent from an upper end of the first clip part 610 to a lower part thereof so as to correspond to the first clip part 610, and may be combined on a front surface of the second housing part 200. Particularly, the second clip part 620 may be provided so as to be in plane symmetry with the first clip part 610. Furthermore, the second clip part 620 may be combined on the front surface of the second housing part 200 by being fitted thereto to a lower end of the second housing part from an upper end thereof. However, this is one embodiment to describe the present invention, and the second clip part 620 may be combined on the front surface of the second housing part 200 in various ways.

The second cut part 640 may be provided by being cut from a lower end of the second clip part 620 to an upper part thereof. Particularly, the second cut part 640 and the first cut part 630 may be provided so as to be in plane symmetry with each other. Accordingly, the second cut part 640 may be provided by being cut from a middle lower end of the second clip part 620 to a middle upper part thereof so as to have a rectangular shape. Accordingly, the second clip part 620 may be provided so as to have a pair of legs with the second cut part 640 between the pair of legs. However, this is one embodiment to describe the present invention, and the second cut part 640 may be provided in various shapes.

Figure 4:
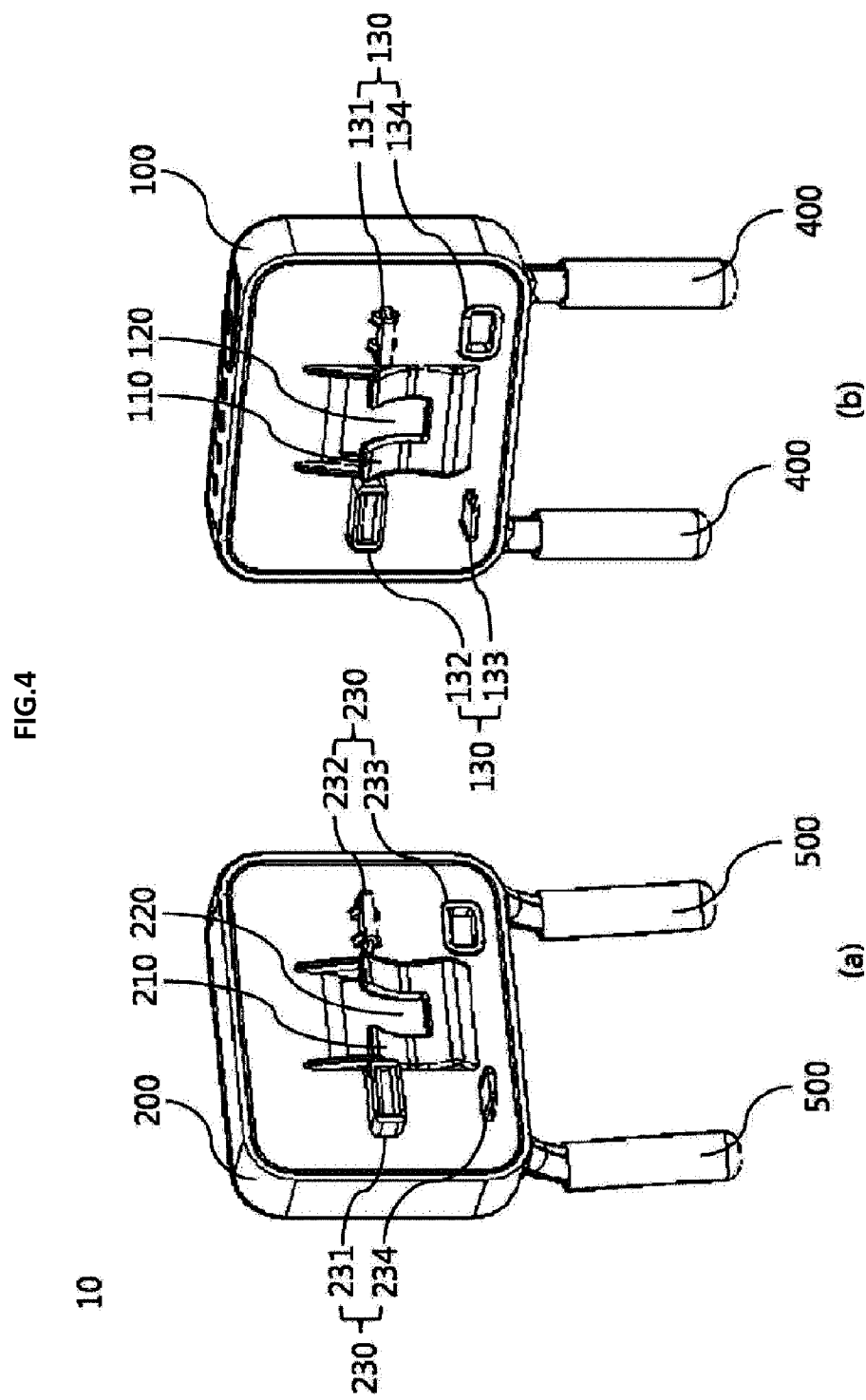
FIG. 4 is views showing combination relations between a first housing part, a second housing part, and the combining clip according to the embodiment of the present invention.

FIG. 4 is views showing combination relations between a first housing part, the second housing part, and the combining clip according to the embodiment of the present invention. Particularly, (a) of FIG. 4 is a view of the second housing part 200 shown in a front thereof, and (b) of FIG. 4 is a view of the first housing part 100 shown in a rear thereof.

Referring to FIG. 4, the lighting device 10 according to the embodiment of the present invention may further include a first clip combining part 110, a second clip combining part 210, a first groove 120, a second groove 220, a first auxiliary combining part 130, and a second auxiliary combining part 230.

In addition, though not shown in the drawings, the lighting device 10 according to the embodiment of the present invention may further include a mainboard, the battery, and a conductive line. Particularly, the mainboard may be provided in any one of the first housing part 100 and the second housing part 200 so as to control the light-emitting diode included in the lighting part 300.

In addition, the battery may be provided in a remaining one of the first housing part 100 and the second housing part 200 so as to provide power to at least one of the mainboard and the lighting part 300.

Furthermore, the conductive line may be provided so as to electrically connect the mainboard with the battery by passing through the combining clip 600 via the first cut part 630 and the second cut part 640.

The first clip combining part 110 may be provided on the rear surface of the first housing part 100 so as to be combined with the first clip part 610. Particularly, the first clip combining part 110 may be provided so as to have a shape corresponding to a shape of the first clip part 610 such that the first clip part 610 is fittingly combined on the first housing part 100. When the first clip part 610 is provided to have a plane shape, the first clip combining part 110 may be provided such that the first clip part of the plane shape is fitted between the first clip combining part 110 and the first housing part 100.

The second clip combining part 210 may be provided on the front surface of the second housing part 200 so as to be combined with the second clip part 620. Particularly, the second clip combining part 210 may be provided so as to have a shape corresponding to a shape of the second clip part 620 such that the second clip part 620 is fittingly combined on the second housing part 200. When the second clip part 620 is provided so as to have a shape of a pair of legs, the second clip combining part 210 is provided such that the leg-shaped second clip part is fitted between the second clip combining part 210 and the second housing part 200. However, this is one embodiment to describe the present invention, and the first clip combining part 110 and the second clip combining part 210 may be provided in various shapes.

The first groove 120 may be provided on the first clip combining part 110 to correspond to the first cut part 630 so as to pass the conductive line therethrough. Particularly, the first groove 120 may be provided by being cut from a middle upper end of the first clip combining part 110 to a middle lower part thereof so as to have a shape corresponding to a shape of the first cut part 630. For example, the first groove 120 may be provided so as to have a rectangular shape from the middle upper end of the first clip combining part 110 to the middle lower part thereof.

The second groove 220 may be provided on the second clip combining part 210 to correspond to the second cut part 640 so as to pass the conductive line therethrough. Particularly, the second groove 220 may be provided by being cut from a middle upper end of the second clip combining part 210 to a middle lower part thereof so as to have a shape corresponding to a shape of the second cut part 640. For example, the second groove 220 may be provided so as to have a rectangular shape from the middle upper end of the second clip combining part 210 to the middle lower part thereof. In this case, the conductive line may electrically connect the mainboard with the battery by passing through the first cut part 630, the first groove 120, the second groove 220, and the second cut part 640. The shapes of the first groove 120 and the second groove 220 described above are merely one embodiment to describe the present invention, and the first groove 120 and the second groove 220 may be provided in various shapes.

The first auxiliary combining part 130 may be provided on the rear surface of the first housing part 100 at opposite sides of the combining clip 600. Particularly, the first auxiliary combining part 130 may include the auxiliary combining part 131 provided at a right side of the upper end of the first clip combining part 110 by protruding from the rear surface so as to have a rectangular shape longitudinal from side to side. In addition, the first auxiliary combining part 130 may include the auxiliary combining part 132 provided at a left side of the upper end of the first clip combining part 110 by protruding from the rear surface to have a space of a rectangular shape therein so as to insert the auxiliary combining part 232 thereinto. In addition, the first auxiliary combining part 130 may include the auxiliary combining part 133 provided at a left side of a lower end of the first clip combining part 110 by protruding from the rear surface so as to have a rectangular shape longitudinal from side to side. Furthermore, the first auxiliary combining part 130 may include the auxiliary combining part 134 provided at a right side of the lower end of the first clip combining part 110 by being recessed from the rear surface to have a space of a rectangular shape therein so as to insert the auxiliary combining part 234 thereinto. However, this is one embodiment to describe the present invention, and the first auxiliary combining part 130 may include only some of the auxiliary combining parts 131, 132, 133, 134, and the auxiliary combining parts 131, 132, 133, 134 may be provided at different positions.

The second auxiliary combining part 230 may be provided on the front surface of the second housing part 200 at opposite sides of the combining clip 600 so as to correspond to the first auxiliary combining part 130, and may be combined with the first auxiliary combining part 130. Particularly, the second auxiliary combining part 230 may include the auxiliary combining part 231 provided at a left side of an upper end of the second clip combining part 210 by protruding from the front surface to have a space of a rectangular shape therein so as to insert the auxiliary combining part 131 thereinto. In addition, the second auxiliary combining part 230 may include the auxiliary combining part 232 provided at a right side of the upper end of the second clip combining part 210 by protruding from the front surface so as to have s rectangular shape longitudinal from side to side. Furthermore, the second auxiliary combining part 230 may include auxiliary combining part 233 provided at a right side of a lower end of the second clip combining part 210 by being recessed from the front surface to have a space of a rectangular shape therein so as to insert the auxiliary combining part 133 thereinto. In addition, the second auxiliary combining part 230 may include the auxiliary combining part 234 provided at a left side of the lower end of the second clip combining part 210 by protruding from the front surface so as to have a rectangular shape longitudinal from side to side. However, this is one embodiment to describe the present invention, and the second auxiliary combining part 230 may include only some of the auxiliary combining parts 231, 232, 233, 234, and the auxiliary combining parts 231, 232, 233, 234 may be provided at different positions.

According to the embodiment of the present invention, the first auxiliary combining part 130 and the second auxiliary combining part 230 corresponding to the first auxiliary combining part 130 are combined with each other, and accordingly, a horizontal rotation of the combining clip 600 may be prevented. In addition, according to the embodiment of the present invention, the first auxiliary combining part 130 and the second auxiliary combining part 230 may be provided to have inserting spaces of rectangular shapes so as to be combined with each other, whereby a horizontal rotation or distortion of the lighting device 10 is effectively prevented.

Meanwhile, when the elastic force of the combining clip 600 is released by an external pressure applied to the upper end of the first housing part 100 and the upper end of the second housing part 200, the lighting device 10 may be detached from glasses. Particularly, when the external pressure is applied to the upper end of the first housing part 100 and the upper end of the second housing part 200, the elastic force of the combining clip 600 is released, and accordingly, the lower end of the first housing part 100 and the lower end of the second housing part 200 move away from each other. Accordingly, the first mounting part 400 provided on the lower part of the first housing part 100 by protruding therefrom and the second mounting part 500 provided on the lower part of the second housing part 200 by protruding therefrom also move away from each other, and accordingly, the lighting device 10 may be detached from the glasses.

Figure 5:
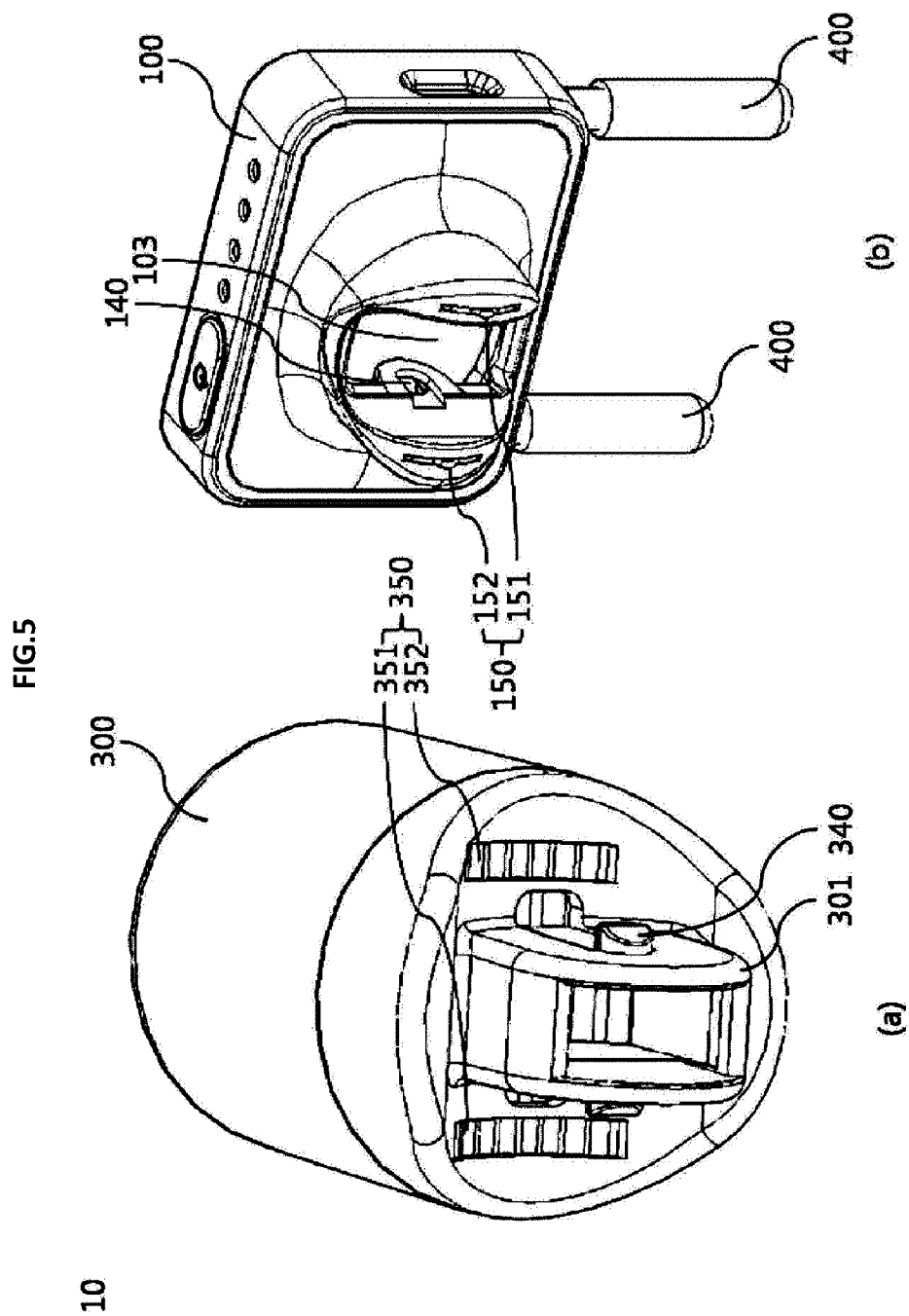
FIG. 5 is views showing a combination relation between the first housing part and a lighting part according to the embodiment of the present invention.

FIG. 5 is views showing a combination relation between the first housing part and the lighting part according to the embodiment of the present invention.

Referring to FIG. 5, the lighting device 10 according to the embodiment of the present invention may further include a holding combination part 140, a rotating combination part 340, a contact part 350, and a contact holding part 150.

The holding combination part 140 may be provided on a front surface of the first housing part 100, and the rotating combination part 340 may be provided on a rear surface of the lighting part 300 so as to be rotatable in the holding combination part 140 in a first direction and a second direction contrary to the first direction.

Particularly, the lighting part 300 may include a protruding part 301 provided on the rear surface thereof by protruding therefrom so as to have a circular shape, and the rotating combination part 340 may be provided on opposite sides of the protruding part 301 by protruding therefrom so as to have a circular shape. In this case, the first housing part 100 may include an inner groove 103 on the front surface thereof so as to receive the protruding part 301, and the holding combination part 140 may be provided by being circularly recessed from opposite sides of the inner groove 103 so as to be combined with the rotating combination part 340. In this case, the first direction may be an upward direction, and accordingly, the second direction may be a downward direction. However, this is one example, and the first direction may be other directions except for the upward direction.

The contact part 350 may be provided on the rear surface of the lighting part 300 along the second direction, the contact part having alternate convex and concave parts. In this case, the convex parts may be parts provided by protruding to the first housing part 100, and the concave parts may be parts provided by being recessed to the lighting part 300. Particularly, the contact part 350 may be provided at one side on the rear surface of the lighting part 300 in upward and downward directions. Furthermore, the contact part 350, for example, may be a wavy shape having the convex parts protruding in the direction of the first housing part 100 and concave parts recessed in the direction of the lighting part 300 alternately.

The contact holding part 150 is provided on the front surface of the first housing part 100 and is held in each of the concave parts according to rotation of the rotating combination part 340 so as to gradually hold the rotating combination part 340. Particularly, the contact holding part 150 is provided by protruding to a front of the first housing part 100 so as to have the elastic force, and accordingly, may be held in the concave parts.

Meanwhile, the contact part 350 may be electrically connected to the light-emitting diode of the lighting part 300, and the contact holding part 150 may be electrically connected to the mainboard of the first housing part 100. In addition, the contact part 350 and the contact holding part 150 may be made of conductive materials. In this case, when the contact holding part 150 is held in the contact part 350, the contact part 350 and the contact holding part 150 may be electrically connected to each other. Furthermore, the light-emitting diode of the lighting part 300 may be electrically connected to the mainboard of the first housing part 100 via the contact part 350 and the contact holding part 150.

Meanwhile, the contact part 350 may include a first contact part 351 provided on a first side of the rear surface of the lighting part 300 so as to have a first length and a second contact part 352 provided on a second side of the rear surface so as to have the second length shorter than the first length, and the contact holding part 150 may include a first contact holding part 151 held in the concave parts of the first contact part 351 and a second contact holding part 152 held in the concave parts of the second contact part 352.

In this case, when at least one engagement of the engagement of the first contact holding part 151 with the first contact part 351 and the engagement of the second contact holding part 152 with the second contact part 352 occurs, the rotating combination part 340 may be gradually held.

Meanwhile, the first contact part 351 and the second contact part 352 are arranged so as to be parallel to the first direction, and each upper end thereof may be arranged at the same position as a position of the axis parallel to the first direction. In addition, when the lighting part 300 rotates at a preset angle or more, electrical connection between the second contact part 352 and the second contact holding part 152 may be disconnected.

Particularly, although the upper end of the first contact part 351 and the upper end of the second contact part 352 are provided at the same position relative to the axis parallel to the first direction, a position of the lower end of the first contact part 351 may be provided at a position lower than a position of the lower end of the second contact part 352 by difference between the first length and the second length, relative to the axis parallel to the first direction. Furthermore, in this case, the first contact holding part 151 and the second contact holding part 152 are provided at the same position, relative to the axis parallel to the first direction. Accordingly, when the lighting part 300 rotates at a preset angle or more, the second contact holding part 152 is located at a position lower than the lower end of the second contact part 352, and accordingly, electrical connection between the second contact part 352 and the second contact holding part 152 may be disconnected. Accordingly, power provided to the lighting part 300 may be disconnected, and power of the light-emitting diode included in the lighting part 300 may be off.

Figure 6:
FIG. 6 is a view showing an example of the lighting device used in reality according to the embodiment of the present invention.

FIG. 6 is a view showing an example of the lighting device used in reality according to the embodiment of the present invention. Referring to FIG. 6, the lighting device 10 according to the embodiment of the present invention is attached to/detached from an upper end of glasses by using the elastic force of the combining clip, thereby providing lighting forward.

Although the exemplary embodiment of the present invention has been described for illustrative purposes, claims of the present invention are not limited to only the embodiment set forth herein, and those skilled in the art will appreciate that various modifications, additions and substitutions are possible, without departing from the scope and spirit of the invention as disclosed in the accompanying claims. Therefore, the scope of the present invention should not be limited to the embodiment described above, and is defined by the accompanying claims and their equivalents if appropriate.

The invention claimed is:

1. A lighting device mountable to glasses, the lighting device comprising:
   a first housing part having a front surface, a rear surface, a lower surface and an upper surface;

a lighting part provided on the front surface of the first housing part;

a second housing part having a front surface, a rear surface, a lower surface and an upper surface, wherein the front surface of the second housing part faces the rear surface of the first housing part, and the second housing part is spaced apart from the first housing part;

a first mounting part provided at the lower surface of the first housing part to mount the lighting device on the glasses;

a second mounting part provided at the lower surface of the second housing part to mount the lighting device on the glasses; and a combining clip positioned between the first housing part and the second housing part and connecting the first housing part with the second housing part, the combining part providing an elastic force such that the first and second mounting parts are capable of being brought closer to each other.

2. The lighting device of claim 1, wherein the combining clip includes:
  a first clip part combined on the rear surface of the first housing part; and
  a second clip part connected to the first clip part and combined on the front surface of the second housing part.

3. The lighting device of claim 2, wherein the combining clip further includes:
  a first cut part formed in the first clip part so that the first clip part has a reversed U shape, to; and
  a second cut part formed in the second clip part so that the second clip part has a reversed U shape.

4. The lighting device of claim 3, further comprising:
  a mainboard provided in any one of the first housing part and the second housing part;
  a battery provided in a remaining one of the first housing part and the second housing part; and
  a conductive line electrically connecting the mainboard to the battery by passing through the combining clip via the first cut part and the second cut part.

5. The lighting device of claim 4, further comprising:
  a first clip combining part provided on the rear surface of the first housing part so as to be combined with the first clip part;
  a second clip combining part provided on the front surface of the second housing part so as to be combined with the second clip part;
  a first groove provided on the first clip combining part to correspond to the first cut part so as to pass the conductive line therethrough; and
  a second groove provided on the second clip combining part to correspond to the second cut part so as to pass the conductive line therethrough.

6. The lighting device of claim 1, wherein when an elastic force of the combining clip is released by external pressure applied to an upper end of the first housing part and an upper end of the second housing part, the lighting device is detached from the glasses.

7. The lighting device of claim 1, further comprising:
  a first auxiliary combining part provided on the rear surface of the first housing part; and
  a second auxiliary combining part provided on the front surface of the second housing part to correspond to the first auxiliary combining part so as to be combined with the first auxiliary combining part.

8. The lighting device of claim 1, further comprising:
  a holding combination part provided on the front surface of the first housing part;
  a rotating combination part provided on the lighting part so as to be rotatable on the holding combination part in a first direction and a second direction contrary to the first direction;
  a contact part provided on the lighting part along the first direction, the contact part having convex parts and concave parts alternating with the convex parts; and
  a contact holding part provided on the front surface of the first housing part so as to gradually hold the rotating combination part by being held in the concave parts by rotation of the rotating combination part.

9. The lighting device of claim 8, wherein the lighting part has a light-emitting diode;
  the first housing part has a mainboard;
  the contact part is made of a conductive material and is electrically connected to the light-emitting diode of the lighting part; and
  the contact holding part is made of a conductive material and is electrically connected to the mainboard of the first housing part.

10. The lighting device of claim 9, wherein the contact part includes a first contact part provided on a first side of the rear surface of the lighting part so as to have a first length and a second contact part provided on a second side of the rear surface so as to have a second length shorter than the first length, and
  the contact holding part includes a first contact holding part held in the concave parts of the first contact part and a second contact holding part held in the concave parts of the second contact part.

11. The lighting device of claim 10, wherein the first contact part and the second contact part are arranged so as to be parallel to the first direction, each upper end of the first contact part and the second contact part being arranged at the same position as a position of the axis parallel to the first direction, and when the lighting part rotates at a preset angle or more, electrical connection between the second contact part and the second contact holding part is disconnected.

* * * * *